J. L. Gilliland,
Tool for Polishing Glass,
Nº 9,533.
Patented Jan. 11, 1853.
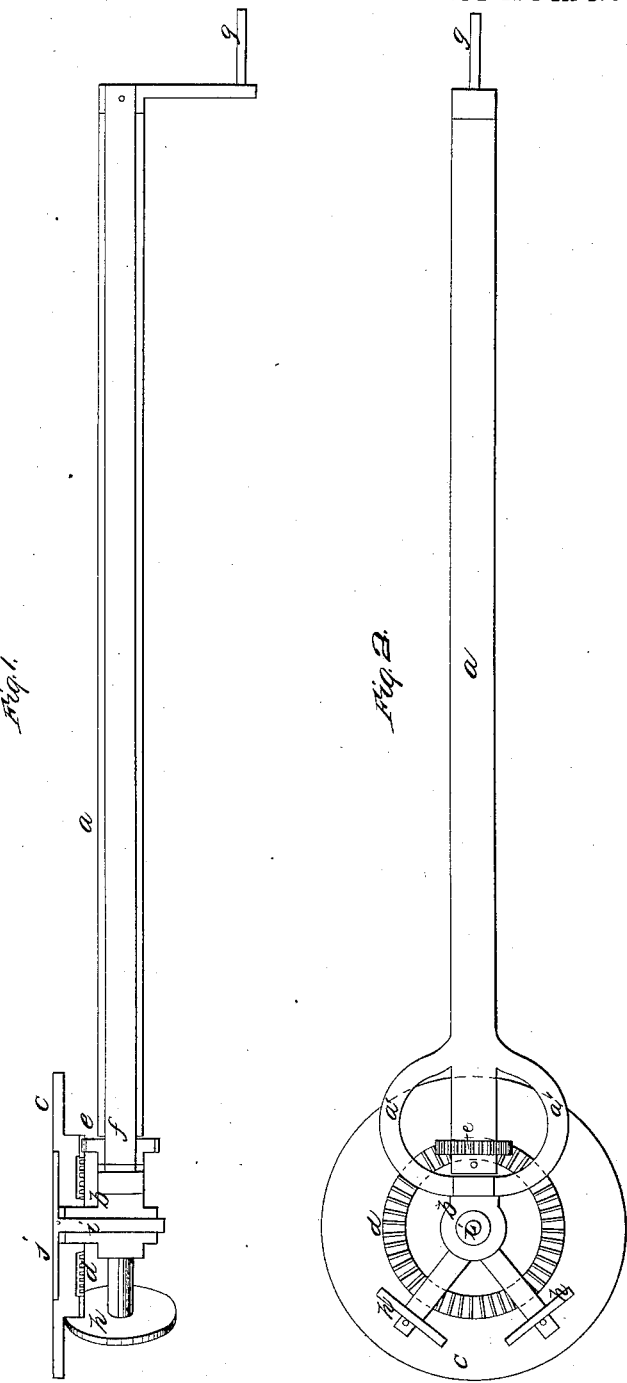

UNITED STATES PATENT OFFICE.

JOHN L. GILLILAND, OF BROOKLYN, NEW YORK.

FIRE-POLISHING GLASS.

Specification of Letters Patent No. 9,533, dated January 11, 1853.

*To all whom it may concern:*

Be it known that I, JOHN L. GILLILAND, of Brooklyn, Kings county, New York, have invented a new Method of Fire-Polishing Glass, and that the following is a full, clear, and exact description thereof, reference being had to the accompanying drawings, making part of this specification, in which—

Figure 1, is a longitudinal vertical section; Fig. 2, a bottom plan.

The method usually pursued in the fire polishing of glass consists in attaching the article to be polished by means of a piece of glass to the end of the ordinary punty iron, inserting it in the fire and turning it around so that it can receive the fire polish. But there are some articles made of glass which require a high polish that cannot be attached by means of a piece of glass to the ordinary punty iron, without destroying their surfaces which are required to be preserved. I refer to lenses, object and image glasses, &c., and it is for the manufacture of such articles that my machine is more particularly intended.

The object of my invention is to obviate the necessity of injuring the surface of the article to be polished, by attaching it as described above to the ordinary punty iron; and the nature thereof consists in the use of a horizontal table on the end of a hollow handle through which an arbor or shaft passes, by means of which rotary motion is communicated to the vertical arbor of the table by gearing, by means of which the glass lens or other article can be rotated in the furnace or "glory hole" by the workman, so as to receive the heat equally all over its surface, without injury to the article from the use of the ordinary mode of attachment.

In the accompanying drawings $a$ is a hollow rod of iron branched at $a'$ $a'$ for the attachment of the arbor $b$ of the rotating table $c$, upon which the article to be fire polished is placed. The under surface of this table (see Fig. 2) is provided with a circular rack $d$, cast in one piece with, or otherwise attached to said table, which circular rack $d$, receives the teeth of the beveled pinion or spur wheel $e$, on the end of a rod $f$, which passes through the hollow rod $a$. By means of a crank handle $g$, the workman can cause the table $c$, with the lens or other article upon it to rotate and be equally fire polished.

Friction rollers $h$, may be attached to the end of the iron to aid the workman in rotating the table.

The arbor $b$, of the rotating table is made hollow for the insertion of the shaft $i$, of the auxiliary or secondary table $j$, which can be dispensed with if desired.

What I claim as my invention and desire to secure by Letters Patent is—

The method, substantially as described, of fire polishing glass by means of a rotating table provided with a hollow handle or its equivalent and gear, by which said table can be rotated as described.

JOHN L. GILLILAND.

Witnesses:
 COR. R. DISOSWAY,
 SAMUEL FROST.